W. A. & C. L. PENFIELD.
ANTIVIBRATION DEVICE FOR VEHICLES.
APPLICATION FILED JAN. 21, 1910.
968,259.
Patented Aug. 23, 1910.
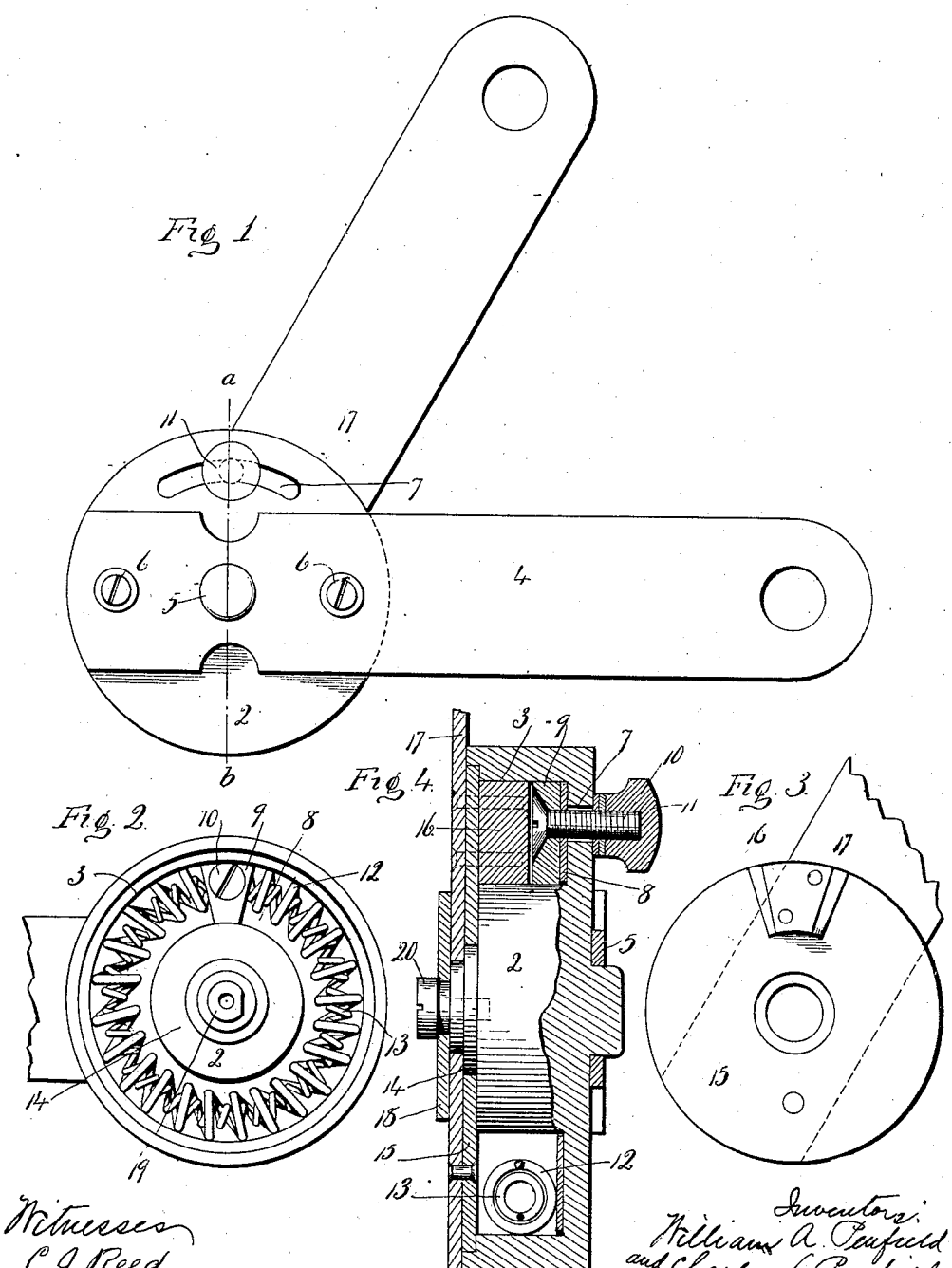

UNITED STATES PATENT OFFICE.

WILLIAM ALLEN PENFIELD AND CHARLES L. PENFIELD, OF MERIDEN, CONNECTICUT.

ANTIVIBRATION DEVICE FOR VEHICLES.

968,259.  Specification of Letters Patent.  Patented Aug. 23, 1910.

Application filed January 21, 1910. Serial No. 539,370.

*To all whom it may concern:*

Be it known that we, WILLIAM A. PENFIELD and CHARLES L. PENFIELD, citizens of the United States, residing at Meriden, in the county of New Haven and State of Connecticut, have invented a new and useful Improvement in Antivibration Devices for Vehicles; and we do hereby declare the following, when taken in connection with the accompanying drawings and the letters of reference marked thereon, to be a full, clear, and exact description of the same, and which said drawings constitute part of this specification, and represent, in—

Figure 1 a side view of an anti-vibration device constructed in accordance with our invention. Fig. 2 a plan view with the plate removed. Fig. 3 an inside view of the plate, detached. Fig. 4 a sectional view on the line *a—b* of Fig. 1, enlarged.

This invention relates to an improvement in anti-vibration devices for vehicles, particularly for automobiles, to absorb or prevent the shock which takes place in the movement of the body with relation to the springs or axle.

The object of the invention is a simple arrangement of parts which is effective when moved in either direction; and the invention consists in the construction hereinafter described and particularly recited in the claim.

In carrying out our invention, we employ a block or hub 2 preferably circular and formed with an annular channel 3. Secured to the inner face or back of the block is an arm 4. As herein shown this arm has a central opening to set over a projection 5 on the hub and is secured in place by screws 6. In the channel we arrange a stop, and preferably a segmental slot 7 is formed in the bottom of the channel. In the channel is a washer or ring 8 and on this washer is located a stop-block 9 which is held in place by a screw 10 which passes through the block through the washer and through the slot 7, and receives at its outer end a thumb nut 11 by which the block may be clamped at the desired position. In the channel we locate a spiral spring 12, the ends of which abut against opposite sides of the block 9. This spring may be a single coil spring, but preferably for power we employ a compound spring, that is, a second or auxiliary spiral spring 13 within the spring 12.

Mounted upon a shoulder 14 on the hub 2 is a circular plate 15 which closes the channel 3. On the inner face of this plate is a wedge 16 corresponding substantially to the block 9 and adapted to enter between the ends of the springs 12 and 13. Secured to or formed as a part of the plate 15 is an arm 17 corresponding to the arm 4. The plate and arm turn on the hub and may be held by a D-washer 18 setting over a D-projection 19 on the hub and a screw 20 so that the arm 17 and the plate 15 may be turned with relation to the hub. The arms 4 and 17 are attached one to the springs and the other to the body of the vehicle in the usual manner of anti-vibration devices for this purpose, and the relative position of the arms 4 and 17 may be changed by turning the nut 11 off from the screw 10 so that the block 9 may turn in the channel to the limit of the slot 7. By tightening the nut 11 this block is located at the desired point. In thus turning the block the spring turns with it. When adjusted if the arms are drawn together the lug 16 engages with one end of the spring and compresses the spring as the opposite end will be held by the block 9. On the other hand if the arms are separated the lug engages with the opposite end of the spring and compresses it so that the spring is compressed when the arms are moved in either direction and the tension is the same in both cases. The strength of the spring will be adapted to the vehicle to which the device is to be applied, and this tension is a fixed one. We thus avoid all friction devices which are liable to change by wear.

It will be apparent without illustration that the block 9 may be permanently fixed in the channel if it is not desired to provide for adjustment.

We claim:—

An anti-vibration device for vehicles comprising a hub having an annular channel, a segmental slot in the bottom of said channel, a ring in said channel, a stop located in said channel, a screw extending through said stop and through said slot, a thumb nut on said screw and adapted to clamp the stop to the hub, a spring in said channel bearing at opposite ends against opposite sides of said stop, a plate connected with said hub and formed with an inwardly projecting lug adapted to enter between the ends of said
5 springs, and arms connected with said hub and plate.

In testimony whereof, we have signed this specification in the presence of two subscribing witnesses.

WILLIAM ALLEN PENFIELD.
CHARLES L. PENFIELD.

Witnesses:
W. A. HALL,
D. E. DICKINSON.